United States Patent
Anttila et al.

(10) Patent No.: US 7,976,809 B2
(45) Date of Patent: Jul. 12, 2011

(54) METHOD AND AN EQUIPMENT FOR REDUCING THE SULPHUR DIOXIDE EMISSIONS OF A MARINE ENGINE

(75) Inventors: Mikko Anttila, Tampere (FI); Risto Hämäläinen, Tampere (FI); Seppo Tuominiemi, Pirkkala (FI)

(73) Assignee: Metso Power Oy, Tampere (FI)

( * ) Notice: Subject to any disclaimer, the term of this patent is extended or adjusted under 35 U.S.C. 154(b) by 0 days.

(21) Appl. No.: 11/798,720

(22) Filed: May 16, 2007

(65) Prior Publication Data
US 2008/0044335 A1    Feb. 21, 2008

(30) Foreign Application Priority Data

May 16, 2006 (FI) .................................. 20065330

(51) Int. Cl.
*B01D 53/50*    (2006.01)

(52) U.S. Cl. .............. 423/243.01; 423/243.08; 423/212; 422/168; 422/169; 422/173; 422/621

(58) Field of Classification Search ............ 423/243.01, 423/243.08; 422/168, 169, 173, 621
See application file for complete search history.

(56) References Cited

U.S. PATENT DOCUMENTS

| | | | |
|---|---|---|---|
| 2,625,298 A | | 1/1953 | Healy et al. |
| 3,446,712 A | * | 5/1969 | Othmer ........................... 203/11 |
| 3,622,270 A | * | 11/1971 | Shah ........................ 423/243.11 |
| 4,293,521 A | * | 10/1981 | Isahaya et al. .................. 422/62 |
| 4,804,523 A | * | 2/1989 | Abrams et al. ........... 423/243.08 |
| 6,810,662 B2 | * | 11/2004 | Sundholm ........................ 60/310 |
| 7,383,793 B2 | * | 6/2008 | Hansson et al. ................ 123/39 |

FOREIGN PATENT DOCUMENTS

| | | | |
|---|---|---|---|
| EP | 692298 A1 | * | 1/1996 |
| FI | 104052 B | | 11/1999 |
| FI | 116156 | | 9/2005 |
| WO | WO-99/44722 A1 | | 9/1999 |

OTHER PUBLICATIONS

Finnish Office Action—Jan. 12, 2007.
European Search Report—Sep. 18, 2007.
Office action issued in counterpart Finnish application 20065330.

* cited by examiner

*Primary Examiner* — Melvin Curtis Mayes
*Assistant Examiner* — Melissa Stalder
(74) *Attorney, Agent, or Firm* — Venable LLP; Eric J. Franklin

(57) ABSTRACT

A method and an equipment for reducing sulphur dioxide emissions of a marine engine, wherein flue gases are scrubbed with a scrubbing solution in a scrubber. Fresh water with added sulphur removal reagent is used as the scrubbing solution.

19 Claims, 4 Drawing Sheets

METHOD AND AN EQUIPMENT FOR REDUCING THE SULPHUR DIOXIDE EMISSIONS OF A MARINE ENGINE

CROSS-REFERENCE TO RELATED APPLICATIONS

This application claims priority under 35 USC §119 to Finnish Patent Application No. 20065330 filed on May 16, 2006.

FIELD OF THE INVENTION

The invention relates to a method for reducing the sulphur dioxide emissions of a marine engine and an equipment for implementing the aforementioned method.

BACKGROUND OF THE INVENTION

Currently, diesel engines are almost solely used as motors of ships in marine traffic. The fuel used in them is oil, which contains sulphur. As a result of combustion, sulphur oxides that are harmful to the environment are created. The current environmental protection regulations allow the usage of fuel containing a maximum of 4% sulphur in marine engines. The requirements for reducing the sulphur dioxide emissions of flue gases of ships will tighten in the near future.

One way to reduce the sulphur dioxide content of flue gases created in diesel engines is to use low-sulphur fuels. Their price when compared to the currently used high-sulphur fuels is, however, very high. In addition, raising the degree of processing of fuel increases sulphur dioxide emissions.

Another alternative is to clean the flue gases before emitting them. For this purpose, it has been proposed to install flue gas scrubbers in ships. One such scrubber is disclosed, for example, in publication WO 99/44722. The publication discloses a wet scrubber, where the flue gas from an engine is conveyed to a scrubber, where it is scrubbed with sea water. A problem of this solutions is that the salty sea water causes corrosion in the scrubber and flue gas ducts. The problems of corrosion can be solved by using corrosion-resistant materials, but their price is so high that the material expenses of the equipment and flue gas ducts will rise unreasonably high. In addition, the amount of scrubbing solution to be removed is large, because in order to reach a sufficient sulphur removal result, a large amount of scrubbing solution has to be used in the scrubbing.

It is also known to reduce the sulphur dioxide content of flue gases in power plants situated on land by scrubbing them with a NaOH-containing scrubbing solution. The scrubbing solution is formed by mixing NaOH with fresh water, i.e. water from a lake or a river, or with tap water purified of them, which water does not include salts, as sea water does.

BRIEF DESCRIPTION OF THE INVENTION

The purpose of the present invention is to disclose a new solution utilizing wet scrubber technique for reducing sulphur dioxide emissions of a marine engine.

The invention is based on the idea that the sulphur dioxide emissions of flue gases of a marine engine used in a ship are reduced by scrubbing the flue gases in a scrubber, where fresh water having sulphur removal reagent added to it is used as scrubbing solution.

The fresh water used in the scrubbing solution is either the used fresh water in the ship, or it is made specifically for the scrubber on the ship. Pure, fresh water brought to the ship can be mixed with the scrubbing solution, but advantageously the fresh water used in the scrubbing solution consists of the so-called grey water formed on the ship and/or of fresh water made on the ship.

The so-called grey water formed on the ship and used in the scrubber is the water that has been used on the ship for washing, cooking, cleaning, dish washing and laundering. Grey water is collected to a separate container, from where it can be conveyed to the scrubber.

Fresh water can also be made by condensing moisture contained in flue gases in the scrubber. For this purpose the scrubbing solution or cooling solution circulating in the scrubber is cooled in an external heat exchanger.

The fresh water used as scrubbing solution can naturally also be made on the ship from sea water by utilizing methods known as such.

A suitable sulphur removal reagent, such as sodium hydroxide (NaOH), is added to the fresh water.

By means of the invention the sodium dioxide content of flue gases can be reduced easily and efficiently. The sulphur removal reagent boosts the sulphur removal results. Since the scrubbing solution is formed of fresh water, no corrosion problems exist in the equipment and flue gas ducts. The amount of scrubbing solution circulating in the scrubber and the concentration of sulphur removal reagent contained in it and the pH are optimized so that no excess scrubbing solution circulates in the scrubber circulation, but only so much as is required by efficient removal of sulphur oxides. This creates savings in the energy costs of pumps pumping the scrubbing solution. Further, because the amount of scrubbing solution to be removed is small, the cleaning equipment of the scrubbing solution coming from the scrubber can be made small. In addition, the pure, fresh water received from the scrubber process can be utilized for other needs of the ship as well.

Further, the equipment according to the invention including the scrubber is formed so compact in size that it is easy to arrange in the narrow spaces of a ship.

In addition to the above-described sulphur oxide removal the scrubber also efficiently removes small particles from the flue gases, resulting in a decrease in the particle emissions of marine engines decrease.

BRIEF DESCRIPTION OF THE DRAWINGS

In the following, the invention will be described in more detail with reference to the appended drawings, in which

In FIGS. 1 to 4, the same numerals refer to corresponding parts, and they will not be explained separately later on, unless required by the illustration of the subject matter.

DETAILED DESCRIPTION OF THE INVENTION

In this description the term fresh water refers to water that comprises no salts. The term grey water refers to water that is created on the ship as a result of washing, cooking, cleaning, dish washing and laundering. The term line refers to any pipe, connection or duct suitable for transferring liquid, gas, or suspension.

Figure 1:
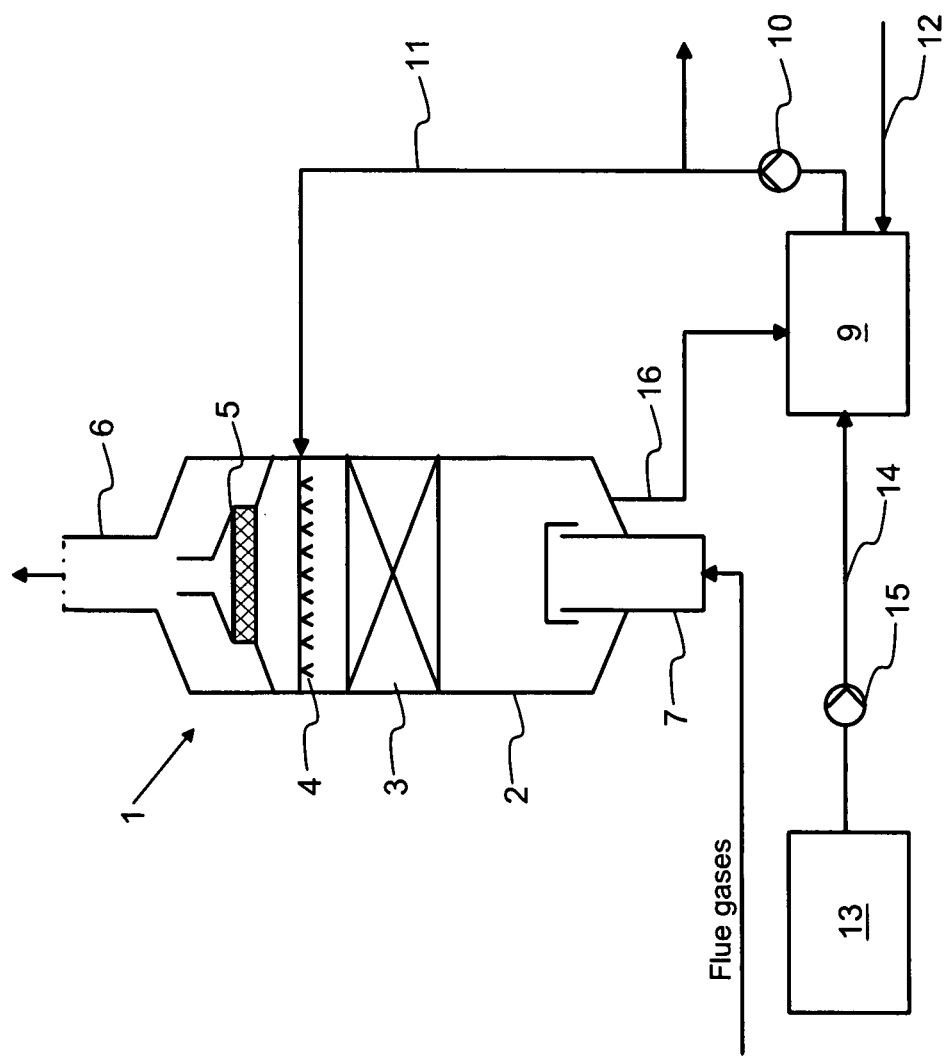
FIG. 1 shows schematically an equipment suitable for cleaning flue gases of a ship.

FIG. 1 shows a scrubber 1 used in scrubbing flue gases of a diesel engine used on a ship. The scrubber 1 has an elongated, substantially vertically installed shell 2, inside which a packed bed 3 has been mounted. Nozzles 4 distributing scrubbing solution to the scrubber have been arranged above the packed bed, after the packed bed in the flow direction of flue gases. The nozzles 4 are arranged at even intervals over the cross-sectional area of the scrubber so that they spray scrubbing solution substantially evenly over the entire cross-sectional area of the scrubber. After the nozzles 4, a droplet separator has been installed in the scrubber, which separator separates the droplets that have been swept along with the flue gases before the cleaned flue gases are directed out via a connection 6 arranged at the upper end of the scrubber.

The flue gases created in a ship's diesel engine or engines, if there are several engines in the ship, are conveyed to the scrubber 1 via a connection 7 installed in its lower part. The diesel engine or engines are not shown in the figure. The flow direction of flue gases in the scrubber is upwards, from the bottom to the top.

Scrubbing solution is conveyed to the flue gas scrubber 1 from the pumping container 9 by means of a pump 10 via line 11. The line 11 is connected to the nozzles 4, which spray the scrubbing solution to the scrubber. The scrubbing solution consists of fresh water directed to the pumping container 9 via line 12, i.e. in this embodiment of the grey water of the ship and the sulphur removal reagent mixed with fresh water. The sulphur removal reagent, i.e. NaOH is conveyed from a sulphur removal reagent container 13 via line 14 to the pumping container 9, to the scrubbing solution. In directing the sulphur removal reagent to the pumping container, a pump 15 arranged to the line 14 is utilized, which also controls the amount of sulphur removal reagent added to the scrubbing solution.

The NaOH fed to the flue gas scrubber reacts with the sulphur dioxide in the flue gases by forming sodium sulphite in accordance with the following formula:

$$SO_2 + 2NaOH \rightarrow Na_2SO_3 + H_2O \tag{1}$$

The sodium sulphite oxidizes in the scrubber at least partly into sodium sulphate. NaOH also reacts with other sulphur oxides in the flue gases and forms other compounds to be removed from the flue gases by scrubbing. The reactions of NaOH and sulphur oxides in the flue gas scrubber are known as such by a person skilled in the art, and therefore they are not described in more detail in this context.

The flue gases are scrubbed with the NaOH-containing scrubbing solution sprayed via nozzles 4. The sodium sulphite and sulphate containing scrubbing solution formed as a result of the reaction of NaOH and sulphur oxides is removed from the scrubber 1 via line 16 arranged in its lower part and is returned to the pumping container 9. From the pumping container 9 the scrubbing solution is recycled to the scrubber 1.

The lower part of the scrubber and the connection point of line 16 to it is arranged so that no scrubbing solution layer is formed in the lower part of the scrubber, as in conventional scrubbers used in power plants operating on land. Either a container in connection with the scrubber or a separate pumping container is used for recycling scrubbing solution. Thus, the scrubber can be built lightweight, because it does not need to carry the weight of the scrubbing solution mass. The pumping container can be placed on the ship so that the mass center of the ship is as close to the bottom of the ship as possible. This is a great advantage. The used scrubbing solution containing sulphur removal products is removed from the scrubbing solution circulation via line 17. The scrubbing solution containing sulphur removal products can be led either directly to the waters surrounding the ship or to a waste water treatment phase, if the ship has one. It is to be noted that the amount of used scrubbing water removed from the scrubbing circulation is significantly small, because the concentration of the scrubbing solution in the scrubbing circulation is great.

Figure 2:
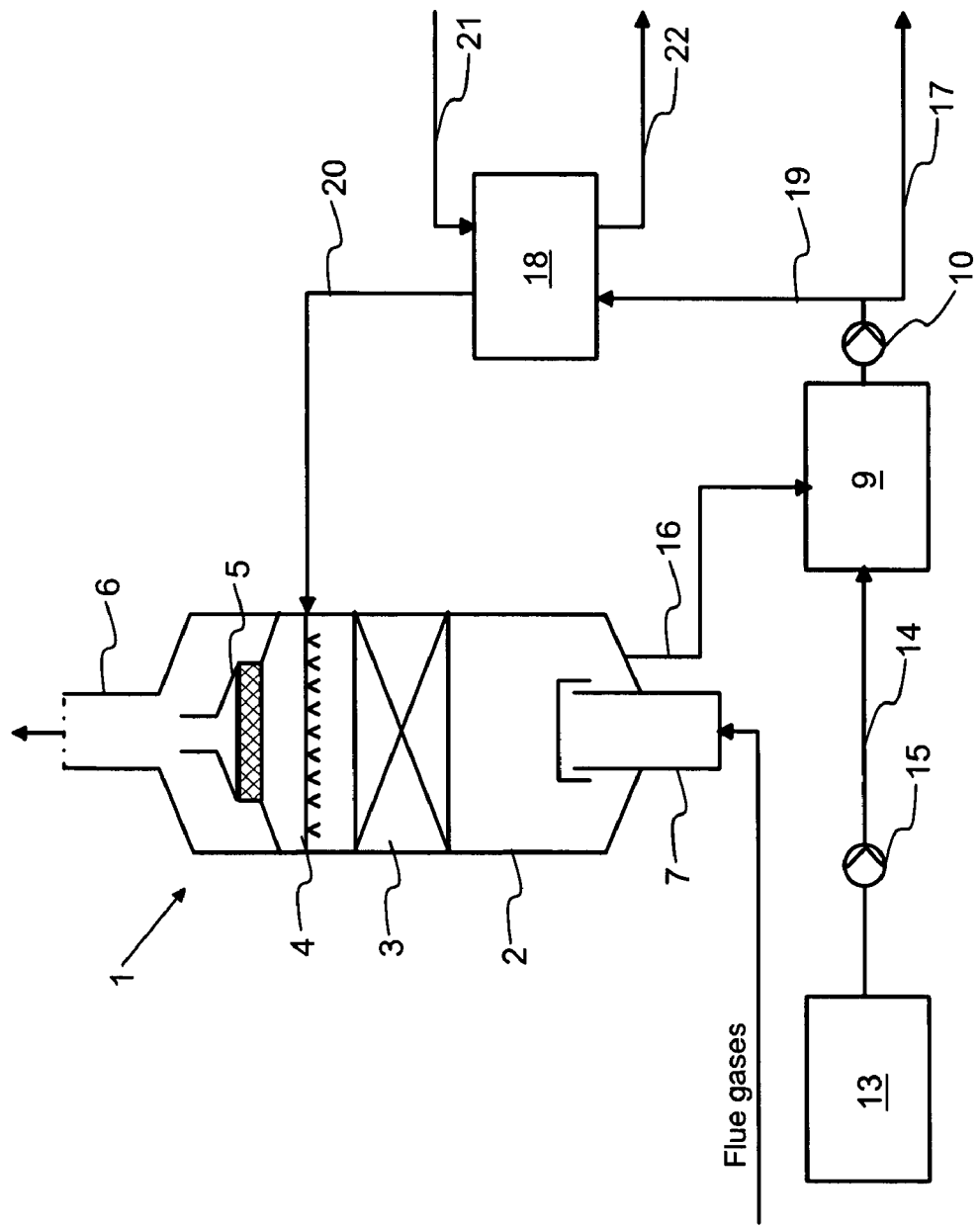
FIG. 2 shows schematically another equipment suitable for cleaning flue gases of a ship.

FIG. 2 shows an embodiment, where the fresh water used in the scrubbing solution is formed by condensing the water vapor in the flue gases by means of cooled scrubbing solution. For this purpose the scrubbing solution used in the scrubber is cooled with an external heat exchanger. In this embodiment the scrubber 1 and its operation, as well as the pumping container 9 and the sulphur removal reagent container 13 are substantially the same as in the embodiment according to FIG. 1. For cooling the scrubbing solution a heat exchanger 18 has been added to the scrubbing solution circulation. The hot scrubbing solution received from the scrubber 1 is pumped with a pump 10 from the pumping container 9 via line 19 to the heat exchanger 18, where the scrubbing solution cools. From the heat exchanger 18 the cooled scrubbing solution is conveyed to the scrubber via line 20. Sea water is used as a cooling medium for cooling the scrubbing solution in the heat exchanger 18. It is led to the heat exchanger 18 via line 21 and removed from there via line 22. The scrubbing solution is removed from the scrubber 1 via line 16 arranged in the lower part of the scrubber and returned to the pumping container 9. From the pumping container 9 the scrubbing solution is recycled again to the heat exchanger 18 and from there to the scrubber 1. The used scrubbing solution containing sulphur removal products is removed from the scrubbing solution circulation via line 17.

Figure 3:
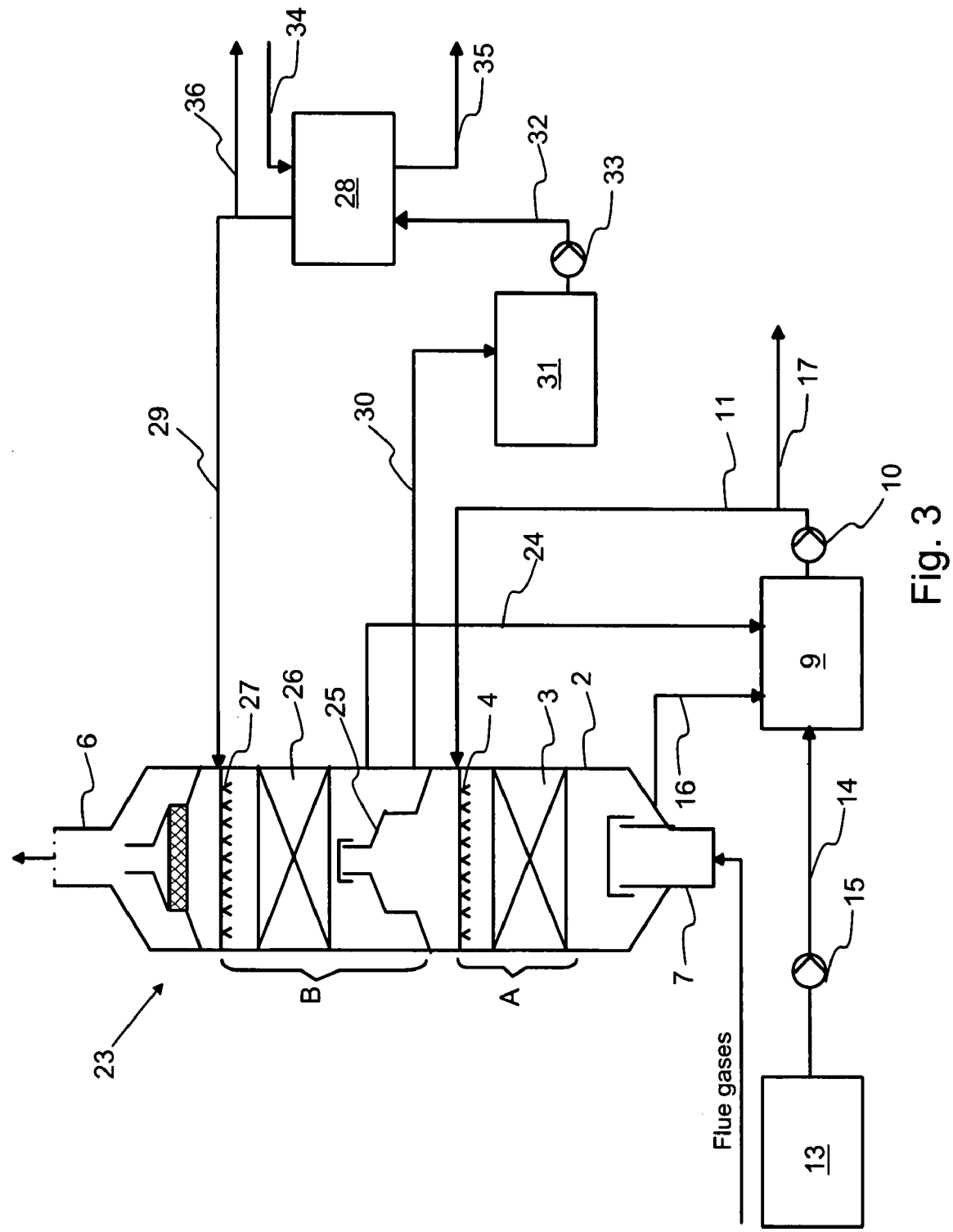
FIG. 3 shows schematically a third equipment suitable for cleaning flue gases of a ship.

FIG. 3 shows an embodiment, where the fresh water used in the scrubbing solution is made by condensing wet flue gases from the sulphur removal phase. Flue gases are condensed separately from the sulphur removal phase by scrubbing them again after the actual sulphur removal scrubbing stage. As a result, the temperature of the flue gases cleaned of sulphur oxides decreases and the water vapor in them condenses into water. The means used in condensing flue gases are arranged in the same scrubber with the means used in sulphur removal. The equipment includes a scrubber 23, which has two scrubbing stages, a sulphur removal stage A and a condensing stage B. The elongated, substantially vertically installed shell 2 of the scrubber embeds both stages, which are installed so that the flue gases coming to the scrubber 23 from the connection 7 are scrubbed first in the sulphur removal stage A. The flow direction of flue gases in the scrubber is upwards, from the bottom to the top.

The packed bed 3 included in stage A and the nozzles 4 spraying scrubbing solution that contains sulphur removal reagent are substantially the same as in the embodiment shown hereinabove in FIGS. 1 and 2. Similarly, the operation of stage A is the same as described above. Scrubbing solution is conveyed to the nozzles 4 from the pumping container 9 by means of a pump 10 via line 11. NaOH is conveyed to the scrubbing solution in the pumping container 9 with a pump 15 from a container 13 via line 14. The sodium sulphite and sulphate containing scrubbing solution formed in the scrubbing stage A is removed form the scrubber 23 via a line 16 arranged in its lower part and returned to the pumping container 9 and recycled from there back to the scrubbing stage A. The used scrubbing solution that contains sulphur removal products and is removed from the scrubbing solution circulation via line 17. The fresh water needed in forming the scrubbing solution is conveyed to the pumping container 9 from the condensing stage B via line 24.

From the sulphur removal stage A the cleaned flue gases flow to the condensing stage B. In the flow direction of flue gases, before the condensing stage B, an intermediate floor 25 separating stages A and B from each other has been installed in the scrubber.

In the condensing stage B, the packed bed 26 is first in the flow direction of flue gases. Nozzles 27 distributing scrubbing solution for condensing flue gases have been arranged above the packed bed 26, after it in the flow direction of flue gases. The nozzles 27 are arranged at even intervals over the cross-sectional area of the scrubber so that they spray cooling solution substantially evenly over the entire cross-sectional area of the scrubber. After the nozzles 27, a droplet separator 5 has been installed in the scrubber 23, which separator separates the droplets that have been swept along with the flue gases before the cleaned flue gases are directed out via a nozzle 6 arranged at the upper end of the scrubber.

In the condensing stage B the flue gases coming from the sulphur removal stage A, whose sulphur oxide content has decreased, are scrubbed with a cooling solution. The fresh water used as cooling solution is formed in this same stage by condensing the flue gases received from the sulphur removal stage. The cooling solution cools the flue gases and makes the water vapor in them to condense to water.

The cooling solution received from the condensing stage B is conveyed from the lower part of the condensing stage via line 30 to a storage container 31 and from there further via line 32 to be cooled in the heat exchanger 28. A pump 33 arranged in line 32 is utilized in transferring the solution to the heat exchanger. Sea water is used as a cooling medium for cooling the cooling solution in the heat exchanger. The sea water is conveyed to the heat exchanger 28 via line 34 and removed from there via line 35. From the heat exchanger the cooled 28 scrubbing solution is recycled to the nozzles 27 of the cooling stage of the scrubber via line 29.

As presented above, the fresh water received from the condensing stage B is used not only in the condensing stage itself, but also in forming the scrubbing solution used in sulphur removal. The cooling solution received from the heat exchanger and removed via line 36, is possible to use for other needs of the ship as well.

The flue gases from the scrubber can still, if desired, be heated before they are released to the environment. When flue gases are scrubbed in a wet scrubber, the result is completely wet, water-vapor-containing, visible flue gas. In some situations the visibility of flue gases is seen as a drawback. This drawback can be overcome by increasing the temperature of the flue gases.

Figure 4:
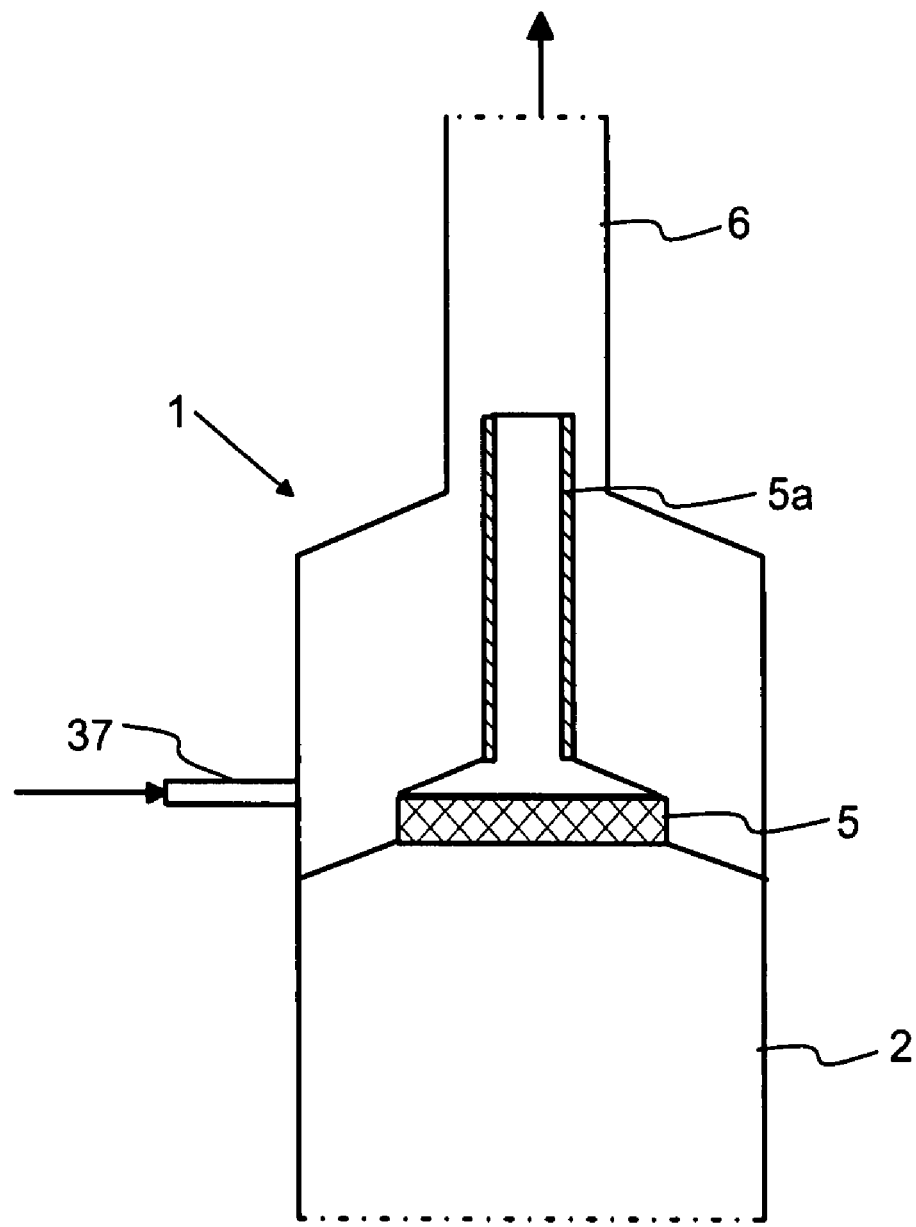
FIG. 4 shows schematically an arrangement suitable for warming the flue gases freed from the scrubber shown in the equipment according to FIGS. 1 to 3.

The visibility of water-vapor-containing flue gases cleaned according to the invention can be decreased by using, for example, an arrangement according to FIG. 4. The arrangement is based on that the above-described method and equipment for decreasing the sulphur dioxide emissions of a marine engine is so effective, that all the flue gases produced by ship engines does not necessarily need to be cleaned in order to realize environmental regulations. Often it is enough that only half or less than a half of the flue gases are scrubbed in the scrubber. The remaining hot and un-cleaned flue gases can be mixed with the cleaned flue gases. Thus, the visibility problem typical for water-vapor-containing flue gases can be overcome.

FIG. 4 shows a new type of a droplet separator 5 located last in the scrubber 1 in the flow direction of flue gases, where the flue gas duct 5a of the droplet separator connected to it has been elongated. In addition, the flue gas duct 5a of the droplet separator is made of heat conductive material, which enhances the warming of flue gases before the mixing of them.

Hot, uncleaned flue gases are conveyed to the upper part of the scrubber via a connection 37. The hot flue gases heat the moist flue gases coming from the scrubber. Warming of the cleaned flue gases also continues in the flue gas duct 6 of the scrubber, where the cleaned flue gases discharged from the flue gas duct 5a of the droplet separator are mixed with the hot flue gases.

In addition, the above-described scrubber has the ability to attenuate the noise caused by the engine. Thus, it can be used to replace the silencer after an engine in a ship. The scrubber can be installed in the space freed from a conventional silencer in the machine shaft of the ship. In this case the scrubber can be placed in a place advantageous from the point of view of stability, that is, low, close to the mass center of the ship.

The invention is not intended to be limited to the embodiments presented as examples above, but the invention is intended to be applied widely within the scope of the inventive idea as defined in the appended claims.

The invention claimed is:

1. A method for decreasing the sulfur dioxide emissions of a marine engine of a ship, the method comprising:
    conveying flue gases created in the engine of the ship to a scrubber;
    using fresh water and sodium hydroxide to scrub sulfur dioxide from the flue gases in the scrubber;
    cooling a scrubbing solution received from the scrubber with an external heat exchanger to obtain a cooled scrubbing solution;
    condensing water vapor contained by the flue gases by distributing the cooled scrubbing solution to the scrubber to produce fresh water on the ship.

2. The method according to claim 1, wherein the fresh water comprises fresh water that is made from sea water.

3. The method according to claim 1, wherein the flue gases are scrubbed in a scrubber, comprising a sulfur removal stage for removing sulfur dioxide from the flue gases, and a condensing stage for condensing the water vapor in the flue gases coming from the sulfur removal stage.

4. The method according to claim 3, further comprising:
    making the fresh water in the condensing stage by distributing the cooled scrubbing solution to the flue gases coming from the sulfur removal stage, said cooled scrubbing solution comprising fresh water received from the condensing stage, wherein the cooled scrubbing solution is cooled in the heat exchanger before recycling the cooled scrubbing solution back to the condensing stage.

5. The method according to claim 1, wherein sea water is used as a cooling medium in the heat exchanger.

6. The method according to claim 1, wherein the fresh water or the scrubbing solution further comprises grey water created on the ship.

7. The method according to claim 1, further comprising:
    providing the fresh water and the sodium hydroxide in said scrubbing solution.

8. The method according to claim 1, further comprising:
    providing the fresh water and the sodium hydroxide in another scrubbing solution, and
    using the another scrubbing solution to scrub sulfur dioxide from the flue gases.

9. An equipment for reducing sulfur dioxide emissions of a marine engine in a ship, the equipment comprising:
- a scrubber for scrubbing sulfur dioxide from flue gases created in the marine engine of the ship using fresh water and sodium hydroxide,
- an external heat exchanger configured to cool a scrubbing solution, wherein the scrubbing solution comprises fresh water, to obtain cooled scrubbing solution,
- wherein the scrubber comprises a condensing stage configured to condense water vapor contained in the flue gases to produce fresh water on the ship, wherein the condensing stage comprises nozzles for distributing the cooled scrubbing solution to the scrubber.

10. The equipment according to claim 9 further comprising:
- means for making fresh water from sea water.

11. The equipment according to claim 9, wherein said condenser further comprises nozzles for distributing the cooled scrubbing solution comprising fresh water formed in a condensing stage to the flue gases coming from a sulfur removal stage.

12. The equipment according to claim 11, wherein said heat exchanger is configured to cool scrubbing solution comprising fresh water received from the condensing stage before the scrubbing solution comprising fresh water received from the condensing stage is recycled back to the condensing stage; and
- at least one line for recycling the scrubbing solution comprising fresh water made in the condensing stage from the condensing stage to the heat exchanger and again to the nozzles.

13. The equipment according to claim 9, wherein the heat exchanger is arranged to use sea water as a cooling medium.

14. The equipment according to claim 9, further comprising:
- a sulfur removal reagent container; and
- a pump for adding the sulfur removal reagent to the fresh water or the scrubbing solution.

15. The equipment according to claim 9, wherein the fresh water or the scrubbing solution further comprises grey water created on the ship.

16. The equipment according to claim 9, further comprising:
- an intermediate floor configured to separate said scrubber and the condenser.

17. The equipment according to claim 9, further comprising:
- at least one line connecting said condenser and said scrubber, wherein the at least one line is configured to convey fresh water from said condenser to said scrubber.

18. The equipment according to claim 9, wherein the scrubbing solution further comprises said fresh water and said sodium hydroxide.

19. The equipment according to claim 9, further comprising
- another scrubbing solution, wherein the another scrubbing solution comprises the fresh water and the sodium hydroxide, and wherein the scrubber is configured for scrubbing sulfur dioxide from the flue gases created in the engine of the ship using the another scrubbing solution.

* * * * *